US008693797B2

(12) United States Patent
Reibman et al.

(10) Patent No.: US 8,693,797 B2
(45) Date of Patent: Apr. 8, 2014

(54) METHOD AND APPARATUS FOR EVALUATING QUALITY ESTIMATORS

(75) Inventors: Amy R. Reibman, Chatham, NJ (US); Francis M. Ciaramello, Bellevue, WA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 207 days.

(21) Appl. No.: 13/309,207

(22) Filed: Dec. 1, 2011

(65) Prior Publication Data

US 2013/0142451 A1 Jun. 6, 2013

(51) Int. Cl.
*G06K 9/40* (2006.01)
*G06K 9/36* (2006.01)

(52) U.S. Cl.
USPC ............................. 382/254; 382/275; 382/284

(58) Field of Classification Search
USPC ......... 382/167, 254, 263, 266, 274, 275, 284, 382/305, 312; 375/240.12, 240.27, 285; 348/92; 701/28
See application file for complete search history.

(56) References Cited

U.S. PATENT DOCUMENTS

| | | | |
|---|---|---|---|
| 7,558,320 B2 * | 7/2009 | Winder et al. ............ | 375/240.12 |
| 7,965,203 B2 * | 6/2011 | Yamagishi et al. ......... | 340/995.1 |
| 8,150,574 B2 * | 4/2012 | Han et al. .......................... | 701/28 |
| 8,275,200 B2 * | 9/2012 | Bilcu et al. ..................... | 382/167 |
| 8,285,058 B2 * | 10/2012 | Sarkar ........................... | 382/209 |
| 2007/0115841 A1 | 5/2007 | Taubman | |
| 2009/0174761 A1 | 7/2009 | Hoory | |
| 2011/0211253 A1 | 9/2011 | Brueck | |
| 2012/0020415 A1 * | 1/2012 | Yang et al. ............... | 375/240.27 |

\* cited by examiner

*Primary Examiner* — Kanjibhai Patel
(74) *Attorney, Agent, or Firm* — Guntin & Gust, PLC; Andrew Gust

(57) ABSTRACT

A system that incorporates teachings of the present disclosure may include, for example, distorting a seed image to generate first and second images where the distortions cause the first and second images to have a potential false tie according to a target quality estimator and generating a third image from the first and second images where the third image is generated based on a proxy quality estimator so that the third image has a potential false ordering according to the target quality estimator. Other embodiments are disclosed.

20 Claims, 10 Drawing Sheets

|  | $W_8$ | $E_8$ | $B_8$ |
|---|---|---|---|
| $W_0$ | correct decision | false differentiation | false ordering |
| $E_0$ | false tie | correct decision | false tie |
| $B_0$ | false ordering | false differentiation | correct decision |
FIG. 2
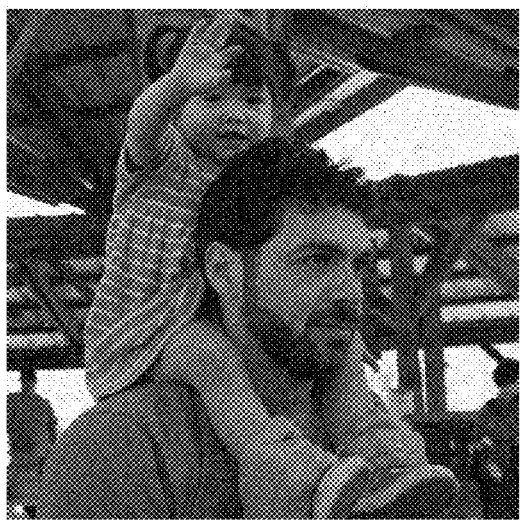
300
FIG. 3A
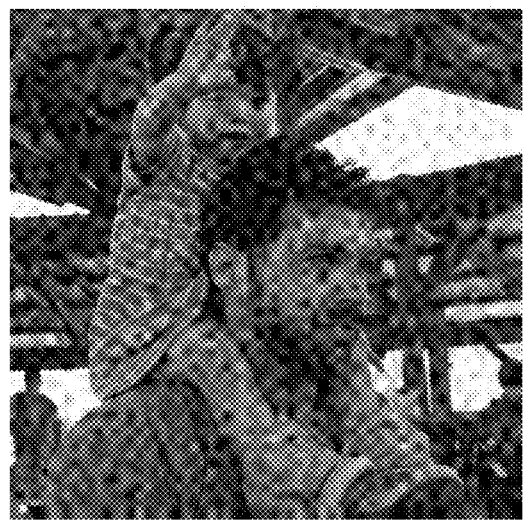
350
FIG. 3B

| Attack | Distortion 1 | Distortion 2 | Target QE | Tolerance | Proxy QE | tolerance |
|---|---|---|---|---|---|---|
| 1 | Blur | AWGN | SSIM | 0.005 | VIF | 0.01 |
| 2 | VDG-noise least visible | AWGN | PSNR | 0.1 | SSIM | 0.005 |
| 3 | VDG-noise most visible | AWGN | PSNR | 0.1 | VIF | 0.01 |
| 4 | VSNR-noise least visible | AWGN | SSIM | 0.005 | VSNR | 0.1 |
| 5 | VSNR-noise most visible | AWGN | SSIM | 0.005 | VSNR | 0.1 |

| Attack 1. | FT | FO | FD | CD | FO range | FD range |
|---|---|---|---|---|---|---|
| PFT SSIM | 8 | 0 | 0 | 2 | -- | -- |
| PFT VIF | 5 | 0 | 0 | 5 | -- | -- |
| PFO SSIM | 0 | 5 | 4 | 1 | 0.02 – 0.13 | 0.01 – 0.15 |
| PFO VIF | 0 | 1 | 3 | 6 | 0.04 | 0.05-0.16 |

| Attack 2. | FT | FO | FD | CD | FO range | FD range |
|---|---|---|---|---|---|---|
| PFT PSNR | 9 | 0 | 0 | 1 | -- | -- |
| PFO PSNR | 0 | 2 | 6 | 2 | 3.49 – 3.60 | 2.56 – 3.41 |
| PFO SSIM | 0 | 2 | 6 | 2 | 0.05 – 0.11 | 0.04 – 0.07 |

| Attack 3. | FT | FO | FD | CD | FO range | FD range |
|---|---|---|---|---|---|---|
| PFT PSNR | 7 | 0 | 0 | 3 | -- | -- |
| PFO PSNR | 0 | 0 | 3 | 7 | -- | 0.47 – 1.07 |
| PFO VIF | 0 | 7 | 3 | 0 | 0.03 – 0.06 | 0.02 – 0.04 |

| Attack 4. | FT | FO | FD | CD | FO range | FD range |
|---|---|---|---|---|---|---|
| PFT SSIM | 9 | 0 | 0 | 1 | -- | -- |
| PFO SSIM | 0 | 0 | 1 | 9 | -- | 0.10 |
| PFO VSNR | 0 | 9 | 1 | 0 | 3.64 – 6.00 | 4.62 |

| Attack 5. | FT | FO | FD | CD | FO range | |
|---|---|---|---|---|---|---|
| PFT SSIM | 10 | 0 | 0 | 0 | -- | |
| PFO SSIM | 0 | 10 | 0 | 0 | 0.07 – 0.19 | |
| PFO VSNR | 0 | 0 | 0 | 10 | -- | |

FIG. 6

| Maker | Horiz. | Vert. |
|---|---|---|
| Kodak DX3600 | 1800 | 1200 |
| Olympus X-2 C50-Z | 2560 | 1920 |
| Panasonic DMC FX-50 | 3072 | 2304 |
| Casio EX-Z700 | 3072 | 2304 |

FIG. 9 Summary of Cameras

| QE | Type | Min. | Max. | Best |
|---|---|---|---|---|
| BIQI | NR | 0 | 100 | 0 |
| CPBD | NR-blur | 0 | 1 | 1 |
| JP2k-NR | NR JPEG-2000 | 0 | 80 | 80 |
| JNBM | NR-blur | 0 | ∞ | 0 |
| GBIM | NR-block | 1 | ∞ | 1 |
| JQS | NR-block | 0 | 10 | 10 |
| PSBIM | NR-block | 1 | ∞ | 1 |
| SSIM | FR | -1 | 1 | 1 |
| VIF | FR | 0 | 1 | 1 |

FIG. 10 Summary of FR and NR QEs considered.

| QE | images | 5% | 25% | 75% | 95% |
|---|---|---|---|---|---|
| BIQI | 473 | 16.25 | 25.02 | 40.90 | 60.90 |
| CPBD | 473 | 0.42 | 0.52 | 0.71 | 0.81 |
| JP2k-NR | 473 | 54.05 | 73.98 | 79.07 | 80.01 |
| JNBM | 473 | 4.14 | 10.63 | 18.63 | 25.33 |
| GBIM | 473 | 1.06 | 1.14 | 1.30 | 1.44 |
| JQS | 473 | 9.12 | 9.71 | 10.23 | 10.80 |
| PSBIM | 473 | 2.93 | 5.67 | 14.12 | 27.61 |

FIG. 11 Statistics for NR QE, undegraded images.

| QE | images | 5% | 25% | 75% | 95% |
|---|---|---|---|---|---|
| BIQI | 473 | 60.58 | 77.62 | 95.45 | 111.68 |
| CPBD | 473 | 0.69 | 0.75 | 0.85 | 0.95 |
| JP2k-NR | 473 | 0.00 | 78.19 | 79.95 | 80.01 |
| JNBM | 473 | 3.18 | 14.73 | 21.49 | 34.13 |
| GBIM | 473 | 11.90 | 17.23 | 29.32 | 66.94 |
| JQS | 473 | -13.80 | -7.01 | -2.98 | -0.96 |
| PSBIM | 473 | 9.44 | 28.31 | 136.14 | 1211.28 |

FIG. 12 Statistics for badly degraded JPEG, Quality Factor 1.

| QE | images | 5% | 25% | 75% | 95% |
|---|---|---|---|---|---|
| BIQI | 440 | 57.91 | 62.58 | 70.10 | 80.70 |
| CPBD | 440 | 0.00 | 0.00 | 0.01 | 0.05 |
| JP2k-NR | 440 | 32.75 | 33.45 | 36.07 | 49.55 |
| JNBM | 440 | 1.43 | 5.50 | 8.85 | 12.62 |
| GBIM | 440 | 0.93 | 0.96 | 1.00 | 1.02 |
| JQS | 440 | 8.45 | 8.97 | 10.05 | 11.62 |
| PSBIM | 440 | 13.27 | 21.57 | 45.90 | 90.79 |

FIG. 13 Statistics for heavy Gaussian blur, $\sigma^2 = 10$.

| QE | images | 5% | 25% | 75% | 95% |
|---|---|---|---|---|---|
| BIQI | 307 | 40.11 | 47.36 | 56.45 | 66.30 |
| CPBD | 307 | 0.06 | 0.13 | 0.26 | 0.40 |
| JP2k-NR | 307 | 32.65 | 33.05 | 36.71 | 8.66 |
| JNBM | 307 | 1.91 | 3.44 | 13.10 | 17.69 |
| GBIM | 307 | 0.93 | 0.97 | 1.04 | 1.11 |
| JQS | 307 | 8.75 | 9.40 | 10.30 | 11.23 |
| PSBIM | 307 | 5.34 | 9.10 | 20.26 | 40.22 |

FIG. 14 Statistics for JPEG-2000, compression factor 200.

| QE | images | min. | 5% | median | 95% | max |
|---|---|---|---|---|---|---|
| BIQI | 84 | 3.80 | 6.36 | 14.01 | 22.60 | 26.50 |
| GBIM | 84 | 0.73 | 0.92 | 1.47 | 2.76 | 4.29 |
| JQS | 84 | 3.02 | 3.26 | 4.59 | 7.06 | 9.32 |
| PSBIM | 84 | 0.84 | 1.04 | 2.74 | 11.12 | 39.83 |
| QE | images | min | 5% | median | 95% | max |
|---|---|---|---|---|---|---|
| BIQI | 84 | 3.90 | 5.25 | 15.44 | 36.75 | 49.39 |
| CPBD | 84 | 0.00 | 0.00 | 0.02 | 0.05 | 0.07 |
| JP2k-NR | 84 | 3.09 | 20.66 | 38.58 | 43.89 | 44.73 |
| JNBM | 84 | 0.06 | 0.15 | 0.48 | 1.10 | 2.24 |
FIG. 15 Invariance to cropping by between 0-9 pixels. JPEG Quality Factor 15; JPEG-2000 compression factor 140.
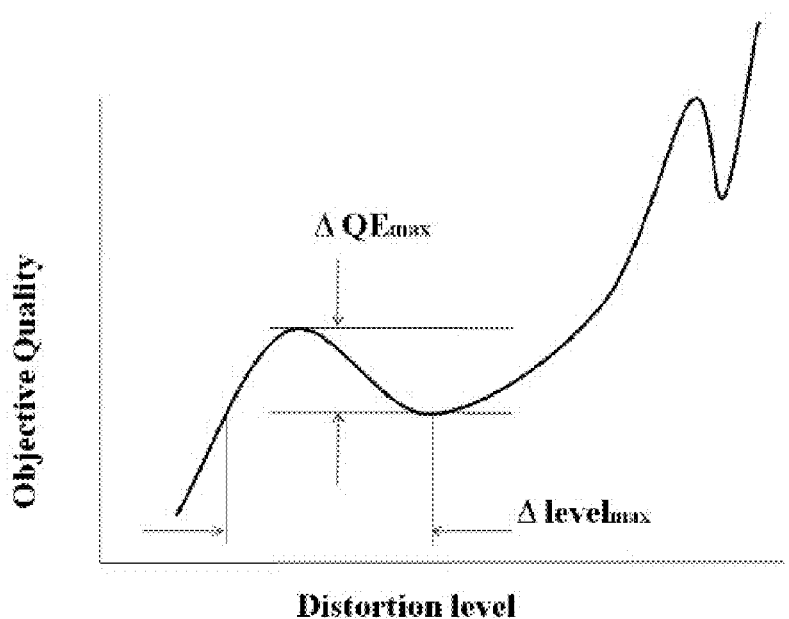
FIG. 16 An example non-monotonicity.

| QE | images | Images with PFO | 80%-ile ΔQE | 80%-ile Δ Level |
|---|---|---|---|---|
| BIQI | 473 | 458 | 8.30 | 81.00 |
| GBIM | 473 | 167 | 0.04 | 15.00 |
| JQS | 473 | 153 | 0.14 | 9.70 |
| PSBIM | 473 | 458 | 1.33 | 28.00 |
| | | 300 | | |
| BIQI | 307 | 300 | 8.34 | 89.50 |
| CPBD | 307 | 281 | 0.01 | 35.00 |
| JP2k-NR | 307 | 273 | 0.58 | 48.00 |
| JNBM | 307 | 306 | 0.39 | 62.00 |
| | | | | |
| BIQI | 440 | 417 | 10.70 | 0.67 |
| CPBD | 440 | 214 | 0.00 | 0.67 |
| JP2k-NR | 440 | 429 | 1.30 | 1.45 |
| JNBM | 440 | 122 | 0.08 | 0.46 |
| | | | | |
| BIQI | 241 | 222 | 9.26 | 378.98 |
| CPBD | 241 | 113 | 0.03 | 744.38 |
| JP2k-NR | 241 | 241 | 0.73 | 167.03 |
| JNBM | 241 | 166 | 0.15 | 162.48 |

FIG. 17 Potential misclassifications for monotonic degradations (JPEG, JPEG-2000, Gaussian blur, AWGN).

METHOD AND APPARATUS FOR EVALUATING QUALITY ESTIMATORS

FIELD OF THE DISCLOSURE

The present disclosure relates generally to image and video quality and more specifically to evaluation of image and video quality estimators.

BACKGROUND

Quality control for images and video is often implemented based on subjective testing using people that compare different images or video content. This can be a time consuming and expensive process. Additionally, subjective testing relies upon representative images which results in an evaluation only of expected behavior. Techniques have been generated for estimating the quality of images and video content, but the accuracy of those techniques can vary depending on the circumstances.

BRIEF DESCRIPTION OF THE DRAWINGS

FIG. 2 depicts an illustrative embodiment of classification results based on relative objective quality estimators and subjective results;

FIGS. 3A and 3B depict an illustrative embodiment of image pairs generated for an evaluation of quality estimators;

FIG. 6 depicts results of an evaluation of quality estimators according to an exemplary embodiment;

FIGS. 9-17 illustrate data and proposed performance measures associated with an example embodiment.

DETAILED DESCRIPTION

Figure 1:
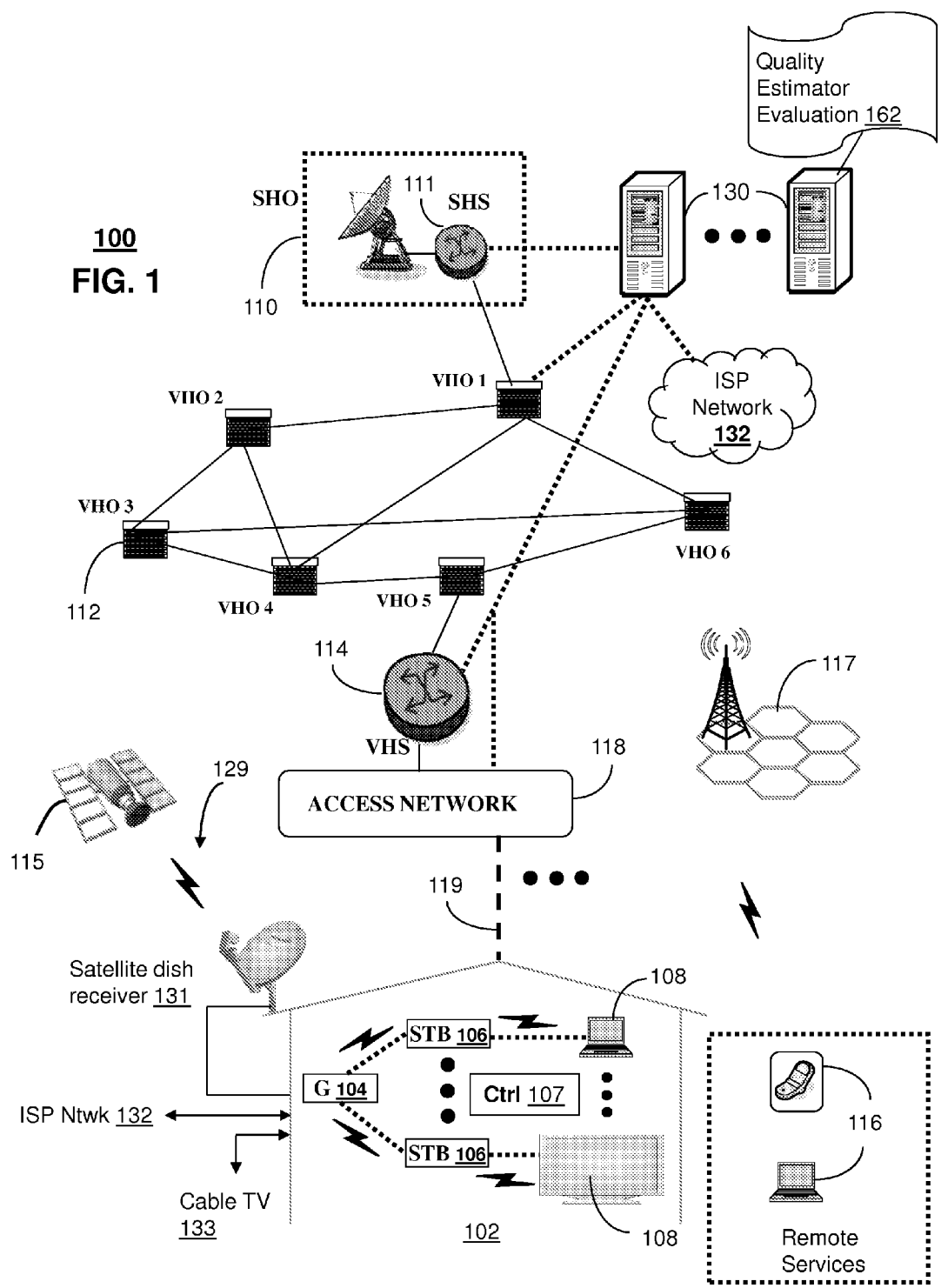
FIG. 1 depicts an illustrative embodiment of a system that provides communication services.

The present disclosure describes, among other things, systems, components and/or methods for evaluating image and video quality estimators (QEs). In one or more embodiments, the evaluation techniques can be objective techniques that are used with or without subjective testing. The evaluation techniques can analyze the QEs to determine vulnerabilities or weaknesses, such as through seeking misclassification errors produced by the QEs. In one or more embodiments, the evaluation techniques can generate a first pair of images with a first misclassification error (e.g., potential false tie) and can generate another image with a second misclassification error (e.g., potential false ordering). In one or more embodiments, proxy quality estimators can be utilized in the evaluation techniques and/or bisection searching can be applied to the first pair of images to generate the other image.

In one or more embodiments, images can be generated having a potential false tie according to one or more quality estimators and other image(s) can then be generated having a potential false ordering according to the target quality estimator. These generated images can be utilized in stress testing various QEs. In another embodiment, a number of evaluation criteria can be utilized with or without the technique for generating images having misclassification errors and/or with or without subjective testing. The evaluation criteria can include determining whether undegraded images receive a high quality score from a QE; determining whether degraded images receive a poor quality score from the QE; determining whether the QE exhibits non-monotonicity for monotonically increasing severity of a single degradation of an image reference; determining whether multiple QEs disagree about the relative quality of image pairs; and determining significant overlap in quality ratings for degraded and highly degraded images.

One embodiment of the present disclosure is a method including obtaining a seed image and obtaining a target quality estimator. The method includes generating first and second images from the seed image utilizing an image processor, where the first and second images are generated by adjusting the seed image so that the first and second images have a potential false tie according to the target quality estimator. The method includes obtaining a proxy quality estimator. The method includes generating a third image from the first and second images utilizing the image processor, where the third image is generated based on the proxy quality estimator so that the third image has a potential false ordering according to the target quality estimator.

One embodiment of the present disclosure is a non-transitory computer-readable storage medium comprising computer instructions, which when executed by a processor cause the processor to perform operations comprising applying at least one quality estimator algorithm to a first image to determine a first quality rating for the first image where the first image is undegraded. The computer instructions can enable obtaining first evaluation criteria by determining whether the first quality rating satisfies a high quality scoring threshold and applying the at least one quality estimator algorithm to a second image to determine a second quality rating for the second image where the second image is degraded. The computer instructions can enable obtaining second evaluation criteria by determining whether the second quality rating satisfies a low quality scoring threshold and monotonically increasing an image degradation to generate third images where the third images are degraded images. The computer instructions can enable applying the at least one quality estimator algorithm to the third images to determine third quality ratings for the third images and obtaining third evaluation criteria by determining whether the third quality ratings produce one of a monotonic or invariant response for the third images. The computer instructions can enable evaluating the at least one quality estimator algorithm based on the first, second and third evaluation criteria.

One embodiment of the present disclosure includes a server having a memory and a controller circuit. The memory has computer instructions and the controller circuit is coupled with the memory. The controller circuit, when executing the computer instructions, is operable to distort a seed image to generate first and second images, where the distortion causes the first and second images to have a potential false tie according to a target quality estimator. The controller circuit is also operable to generate a third image from the first and second images, where the third image is generated based on a proxy quality estimator so that the third image has a potential false ordering according to the target quality estimator.

FIG. 1 depicts an illustrative embodiment of a system 100 for evaluating image and video quality estimators (QEs) and/or for providing communication services to end user devices.

The system 100 can provide for evaluation of various QEs which can generate vulnerability data for improving the QEs, as well as providing the service provider with a better understanding of the circumstances surrounding a potential deployment of the particular QE.

The system 100 can represent an Internet Protocol Television (IPTV) media system. The IPTV media system can include a super head-end office (SHO) 110 with at least one super headend office server (SHS) 111 which receives content from satellite and/or terrestrial communication systems. In the present context, content can represent in whole or in part, for example, messages, text, audio, moving images such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia content, including broadcast content, via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control). Other data can be distributed to the media processors 106 via the gateway, including voice messages, text messages, voice communications, video conferencing and combinations thereof.

The gateway 104, the media processors 106, and/or media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can also be used in the system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The embodiments of the present disclosure can apply to other over-the-air and/or landline media content services system.

Some of the network elements of the IPTV media system can be coupled to one or more computing devices 130, a portion of which can operate as a web server for providing web portal services over an Internet Service Provider (ISP) network 132 to wireline and/or wireless devices, including media devices 108 and/or portable communication devices 116.

Multiple forms of media services can be offered to media devices over landline technologies in communication system 100 such as through the devices and/or techniques described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

System 100 can also provide for all or a portion of the computing devices 130 to function as an evaluation server for QEs (herein referred to as server 130). The server 130 can use common computing and communication technology to perform function 162, which can include among things, evaluating the performance of QEs such as through the generation of stressful test images, as well as the evaluation of false ties, false differentiation and/or incorrect ranking by the QEs. The exemplary embodiments can utilize any number of servers 130 which can implement any number of evaluators 162 for the QEs.

Server 130 can be utilized to improve upon the subjective tests used to evaluate QEs that are expensive, time consuming, and not designed to find systematic weaknesses in the evaluated QEs. Server 130 can be used to supplement subjective testing procedures of QEs and can facilitate the design or adjustment of objective QEs which are better able to accurately characterize human quality assessment.

QEs can be used for algorithm optimization, product benchmarking, outage detection, among other applications. In one or more embodiments, the evaluation techniques performed by server 130 can be used in combination with a comparison of the QE output scores to the results of subjective tests using humans. The subjective tests, can choose uncompressed content, choose degradation types (i.e., compression, noise, blur), and apply the degradation types at different severity levels. Then the humans can identify or label the large set of images.

Server 130 can enable, in addition to examining performance given expected inputs, evaluating QE performance when unexpected inputs are provided. If a QE has a "bug", or systematic weakness, then an attacker can exploit this weakness. Weaknesses can occur when the objective QE has output greater than a threshold T ($Q_{obj}$>T) but the actual subjective quality is less than the same threshold ($Q_{subj}$<T), or vice versa. Objective QEs can have some instances in which this occurs, those QEs with systematic weaknesses are most vulnerable to exploitation.

Server 130 can be utilized to find errors to improve the efficacy of the QE. The evaluation of the accuracy of QEs can include finding vulnerabilities in the QE. The identification of vulnerabilities can be used to improve the design of the QE in order to improve its accuracy. In addition, knowledge of potential vulnerabilities enables those who are selecting a QE for deployment in a real system to make a fully informed choice about the inherent risks of each QE. For example, a network provider may decide to deploy a bitstream-based QE even though it will be vulnerable to attack by a pixel-based QE, because it is a cost-effective solution.

Server 130 can find errors through use of both positive and negative tests. Server 130 can test with conditions that are unanticipated during the initial specification of the QE. The evaluation techniques of server 130 enable a cost-benefit approach. Test cases developed for QEs can be based on finding a set of test cases that will have the greatest chance of identifying a vulnerability in the QE under test, such as through maximizing the number of identified vulnerabilities using a fixed number of test cases.

Server 130 can systematically generate or design image pairs to probe suspected weaknesses in a specific QE. The exemplary embodiments can be applied to images, as well as testing video quality estimators. In one or more embodiments, server 130 can further employ, in whole or in part, other techniques for evaluating QEs, including the Maximum Differentiation competition (MADC) where an optimization strategy is applied to create two images which have extremal QE values for one QE, but constant QE values for another QE. Another technique which can be employed in whole or in part includes creating a set of test images with equal QE values, all created by different processing algorithms.

Server 130 provides a set of strategies for identifying systematic weaknesses in a QE, including generating test cases (e.g., pairs of degraded images) that create a misclassification error by a QE. In one or more embodiments, once a targeted set of images are created, they can be subjectively labeled or identified to enable testing of this and other QEs for errors.

To compute the accuracy of a QE given an existing subjective data set, computing the misclassification errors between a given QE and subjective data can be performed. For example, Matlab source code can be utilized in this computation. Misclassification errors can include false ranking or false ordering (FO) (e.g., the objective QE rates an image pair opposite to the humans), false differentiation (FD) (e.g., the objective QE rates an image pair as different but the humans do not), and false tie (FT) (e.g., the humans rate an image pair as having different quality but the objective QE does not).

Misclassification errors can be defined for a pair of images as shown in FIG. 2 which indicates the conditions necessary for the different classification results in this exemplary embodiment. Here $W_s$, $E_s$, and $B_s$ indicate the statistical decisions that the first image has worse, equal, or better subjective visual quality than the second image, respectively. Similarly, $W_o$, $E_o$, and $B_o$ indicate that the objective QE rates the first image to have worse, equal, or better subjective visual quality than the second image, respectively. The latter decision depends on a threshold, $\Delta o$, which is the necessary absolute difference between the objective QE scores before they are considered to be unequal. Vulnerability assessment of QEs can indicate these misclassification regions are the avenues in which an attacker may try to gain a monetary advantage over another party. Thus, finding a "bug" in a QE can correspond to finding a systematic method to create image pairs that cause misclassification errors. To characterize how vulnerable an objective QE is, a sufficient number of image pairs can be obtained that have relative QE scores in each of these regions. Subjective testing strategies can generate samples with misclassifications only randomly. Server 130 can employ strategies to create image pairs with the purpose of obtaining each type of misclassification error. The same systematic weakness can produce an image pair with any one of these misclassification errors. Reliably identifying subjective differences ($W_s$ or $B_s$) can require fewer participants than verifying subjective equality ($E_s$). Therefore, FTs and FOs can be easier and less expensive to verify than FDs. Server 130 can select types of misclassification errors to obtain, such as identifying FOs and FTs. An FT can have a larger subjective difference than a FO; however, an FO may be considered more damaging because of the complete disagreement between objective and subjective scores. In addition, identifying an FO can provide information about the severity of the systematic weakness.

Server 130 can employ methods or techniques for systematically creating or designing image pairs to probe suspected weaknesses in a specific existing QE. A test case (e.g., an image pair) can include at least two features. First, the test case can expose a vulnerability (e.g., as defined by misclassification errors). Second, the test case can be efficiently verified subjectively as to whether or not the two images have different visual quality. These approaches can be applicable for any type of QE: full-reference (FR), reduced-reference (RR), or no-reference (NR), including parametric bitstream QEs.

In one or more embodiments, the server 130 can employ either or both of "black-box" and "white-box" methodologies. In black-box testing, the test data can be determined solely from the specifications, such as how the QE should behave in expected situations. Black-box testing can include both a subjective testing methodology used for QEs and more targeted adversarial testing. White-box testing can evaluate the logic and design of the specific QE under test for potential sources of error. The test cases can be developed to stress a specific QE; however, the exemplary embodiments can be applied to multiple QE evaluations. Server 130 can apply any test case with a high probability of producing an error to each QE under test. White-box strategies can be more likely to expose vulnerabilities in a QE that can be more readily addressed.

White-box testing can include domain-specific attacks or adversarial attacks. Domain-specific attack strategies can target specific models within a QE. Adversarial attacks can use one (or multiple) more accurate QEs to systematically identify weaknesses in another QE (or QEs). The more accurate QE can function as a "proxy" for the actual, unknown subjective quality. Using the proxy, another one (or multiple) objective QEs are "targeted" to create at least one image whose actual subjective quality is not accurately characterized by the QE. These adversarial models can be white-box, exploiting specific logic in the design of the target QE, and/or black-box.

Server 130 can employ adversarial and/or domain-specific approaches to create image pairs with Potential False Ties (PFTs). Given a generated image pair with PFT, server 130 can employ an adversarial approach which is effective at creating a new image pair with Potential False Orderings (PFOs). In the exemplary embodiments, the QE being tested is called the "target QE", denoted by the function $Q_t(\ )$, while the proxy QE is $Q_p(\ )$.

Because prior to subjective testing, there can be a lack of complete certainty that an image pair actually generates a misclassification error; therefore, we emphasize this uncertainty by including the word "potential." This qualifier in the exemplary embodiments can be dropped after subjective testing is completed.

In one or more exemplary embodiments, server 130 can be used to generate test cases that will result in a potential false tie for a targeted QE. The PFT test cases can then be used as a starting point to generate test cases that result in potential false orderings. Various methods can be employed to construct image pairs that produce false ties, including a Maximum Differentiation Competition (MADC), as well as a bisection search and/or white-box methods that target specific QEs.

In one embodiment, the MADC can be employed as an adversarial approach to create image pairs with PFT. An initial stimulus image is modified iteratively to generate two image pairs. Iterations can proceed using constrained gradient ascent/descent search. After each step in the iterations, the images in each pair may have identical scores with the target QE. At the conclusion of the iterations, the images in each pair may also have extremal scores (minimum and maximum) with the proxy QE. This method of construction may be restricted to those QEs for which the gradient of the QE can be easily computed for any image as described more fully in "Maximum differentiation (MAD) competition: A methodology for comparing computational models of perceptual quantities," by Z. Wang and E. Simoncelli, J. of Vision, vol. 8, no. 12, pp. 1-13, September 2008, the disclosure of which is hereby incorporated by reference.

As a final step in the MADC, a pairwise subjective comparison can be performed on each of the two pairs. If the quality of the images in an extremal pair is rated as significantly different, then the QE whose scores are equal for this pair is a loser of the competition. Each QE can take the role of target and proxy; therefore, this procedure may determine that both QEs have systematic weaknesses. If the images in a pair have subjectively different quality, then MADC can produce a False Tie in the target QE; otherwise, MADC produces a False Difference in the proxy QE. However, MADC is unlikely to produce a False Ordering misclassification.

Server 130 can perform image generation using a systematic search over a distortion set. Given a target QE ($Q_t$), a target value $Q^*_t$, a reference image x, and a distortion function D, server 130 can search for an image such that $|Q_t(D(x))-Q^*_t|<\Delta Q_t$. An acceptable tolerance, $\Delta Q_t$, can be chosen, such as to be half the $\Delta o$ as previously described. Server 130 can employ a bisection search such as over a single variable of the distortion function, which in one embodiment can require that $Q_t$ has a monotonic response as the parameter is varied. To facilitate convergence, if D requires a random number generator, the same initial seed (e.g., seed image) can be used in each step of the iteration. Although, the exemplary embodiments can be extended to utilize different reference images.

Server 130 can utilize a bisection search as an effective way to implement a comparison of a target QE across a set of desired or "typical" distortions (e.g., blur, noise, and/or compression). These techniques can be used to explore weaknesses in Mean Squared Error (MSE) QEs by creating a set of images, one for each distortion, such that all images have identical MSE. By computing other QEs on the resulting image set, they also find other misclassification errors; however, this strategy may only find False Ties in the target QE. While they present results only for MSE, it is possible to apply this strategy to target any QE. This strategy can be further utilized to target both Visual Information Fidelity (VIF) and Structural Similarity (SSIM) QEs.

Server 130 can generate or construct images having potential false ties using white-box targeting. Methods for white-box testing can be as varied as the QEs they are designed to target. Several strategies for white-box testing of QEs can be employed by server 130 to identify PFTs. In one exemplary embodiment, server 130 can stress the model of the Human Visual System (HVS) inside the QE. In another exemplary embodiment, server 130 can be used to examine the implicit assumptions made by the QE. In another exemplary embodiment, a white-box attack on one QE can be combined with a black-box adversarial approach to create flexible construction methods for PFTs on a range of QEs.

Referring to FIGS. 3A and 3B, an exemplary test case (image pairs) are shown that were generated using a white-box, HVS masking model attack strategy. The image pair was generated by injecting noise in the most visible and least visible portions of the image, as defined by Visual Signal-to-Noise Ratio (VSNR). The image 300 has a Peak Signal-to-Noise Ration (PSNR)=22.9 dB and VSNR=35.4. The image 350 has PSNR=22.3 dB and VSNR=10.6. Like many HVS models, both the VSNR and the Visual Distortion Gauge (VDG) can apply a visual masking model to determine the visibility of distortions (i.e., the target) in a specific image (i.e., the mask). The models can identify regions in the image that increase the noise detection thresholds. In one embodiment, to stress an HVS model, server 130 can utilize a noise signal with a fixed MSE that, when added to the reference image, is either maximally visible or minimally visible according to these HVS models. VSNR can be used to compute contrast thresholds for the visibility of distortions using a wavelet model. When distortions are suprathreshold, VSNR is determined by the linear combination of two quantities: the total amount of error, and the distribution of the errors across frequency (or wavelet scale). VSNR can apply a global precedence model that defines the error distribution across scales that best preserves global precedence.

Using this exemplary model, VSNR can define the error distribution across scales that will lead to the best visual quality. Visual quality can be reduced when the actual distribution of errors across scales deviates from this ideal. Therefore, to maximize or otherwise increase VSNR for a fixed PSNR, the variance of an Additive White Gaussian Noise (AWGN) at each scale of the wavelet decomposition can be adjusted such that the error signal at each scale equals the ideal error distribution. Conversely, to minimize VSNR, AWGN can be added only to the one wavelet scale that has the least ability to mask it. The resulting noise is a frequency-shaped so-called "VSNR-noise" that is either least visible or most visible, according to the VSNR HVS model.

FIGS. 3A and 3B show images with added VSNR-noise. The image 300 has least-visible VSNR-noise, while the image 350 has most-visible VSNR-noise. Each image 300 and 350 has nearly identical PSNR. Similarly, VDG computes a pixel-wise Just-Noticeable Difference (JND) estimator that incorporates background luminance adaptation and local activity masking. VDG is composed of three additive terms, which compute the local contrast increase and decrease for edge pixels and the local contrast change for non-edge pixels, respectively. Thus, it is possible to create different spatially-shaped "VDG-noise" distortions, by modulating an AWGN signal by each local contrast model. Specifically, least-visible VDG-noise maximizes or otherwise increases quality as measured by the VDG (i.e., it minimizes the VDG) for a fixed PSNR by multiplying the AWGN signal by the amount that the local contrast exceeds a multiple of the local JND. This may effectively hide the noise in regions of the image where textures or an edge will mask it. Similarly, most-visible VDG-noise is produced by modulating the AWGN signal by the amount that the local JND exceeds the local contrast. This may effectively inject noise into regions that cannot mask it.

Stressing the HVS model used within a QE may not provide any particular misclassification error or indeed any misclassification at all, because it depends on the degree of robustness of the HVS model. However, the noise signals produced by such attacks can be helpful in targeting suspected weaknesses in other QE. For example, the Peak Signal-to-Noise Ratio (PSNR) can have significant, systematic weaknesses in quantifying perceptual quality. PSNR can make at least two incorrect assumptions when measuring visual quality: that neither the correlation between the error and the image, nor the correlation between the error and itself is important. Image pairs to test the first assumption can be created by adding spatially-shaped least and most-visible VDG-noise to a reference image utilizing server 130. Image pairs to test the second assumption can be created by adding frequency-shaped least- and most-visible VSNR-noise to a reference image utilizing the server 130. In addition, images containing noise shaped by an HVS model can be successfully combined with a black-box adversarial approach. The HVS model in the proxy QE is used to create a distortion function (i.e., a noise model). A bisection search can be applied, such as utilizing the server 130, to find the level of the distortion that is necessary to create an image that has a specific target value in another target QE. For example, an attack can be implemented by server 130 that targets SSIM using VSNR-noise. If the model inside the proxy QE is accurate, false ties can be created in the target QE. If not, then other types of misclassifications may result. However, by specifically stressing the HVS masking models, it is likely that server 130 can produce test pairs that have a high probability of finding an error in either the target or proxy QE.

While False Ties may require little subjective testing to verify the presence of a weakness in a QE, False Ties can have limited effectiveness for characterizing just how large a weakness has been identified. False differences can be expensive to obtain subjective results with a high degree of confidence. One or more of the exemplary embodiments can include a method to create a Potential False Ordering from any input pair that has Potential False Tie. False Orderings can provide additional information about the degree of weakness in a target QE. For instance, two images, $x_1$ and $x_2$ can have a Potential False Tie (PFT) for the target QE: $|Q_t(x_1) - Q_t(x_2)| < \Delta Qt$. The image $x_1$ can be created from reference image x using distortion function $D_1$ at level $p_1$, and $x_2$ can be created from the same reference image using distortion function $D_2$ at level $p_2$. $D_2$ can be selected or otherwise defined such that increasing levels of distortion create a monotonic response in $Q_t$. To create a Potential False Ordering (PFO), a proxy QE ($Q_p$) can be selected (e.g., from a group of proxy QEs) which is expected to be more accurate than $Q_t$ for the distortions of interest. Server 130 can compute $Q_p(x_1)$ and $Q_p(x_2)$. Server 130 can then employ the bisection search algorithm described above to search for a distortion level for distortion function $D_2$ such that:

$$\left| Q_p(x_3) - \frac{Q_p(x_1) + Q_p(x_2)}{2} \right| < \Delta Q_p,$$

within tolerance $\Delta Q_p$.

Figures 4, 5:
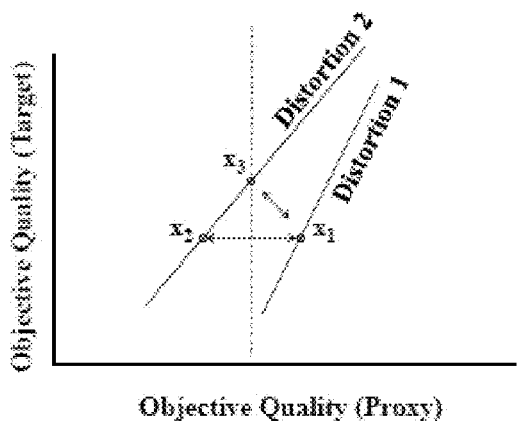
FIG. 4 depicts an illustrative embodiment of a graphical representation of creating a potential false ordering for evaluating quality estimators.
FIG. 5 depicts an illustrative embodiment of evaluation strategies for evaluating quality estimators.

It is likely that $Q_p(x_1)$ and $Q_p(x_3)$ have the opposite ordering relative to $Q_t(x_1)$ and $Q_t(x_3)$; therefore image pair $(x_1, x_3)$ can form a PFO for one of the two QEs. If the proxy QE is inadequate, it may not find a FO in the target QE, but instead expose some of its own weaknesses. FIG. 4 illustrates this graphically. Images $x_1$ and $x_2$ have different distortions but identical quality according to the target QE. An image $x_3$ can be identified or otherwise obtained with the same distortion type as $x_2$, but with quality mid-way between image $x_1$ and $x_2$, according to the proxy QE. A similar graphical representation can be drawn when $Q_p(x_2) > Q_p(x_1)$.

In one or more embodiments, server 130 can be used for designing and/or implementing targeted subjective tests. The existence of consistent, systematic misclassifications in existing QEs can be provided. The exemplary embodiments are not restricted to the type of QE being targeted, although the examples are described with respect to FR QEs.

Example 1

We choose 10 reference images from a CSIQ database, which are selected to be representative. For each reference image, we use one of the below described methods to create an image pair with PFT. For each resulting image pair, we then apply the technique described above which uses a proxy QE to find a PFO in the original target QE. The proxy QEs of VIF, SSIM, and/or VSNR can be computed in a number of different ways, including using the MeTriX MuX Matlab package. Referring additionally to the summary of FIG. 5 and the results in FIG. 6, the following image pair techniques were employed:

1. We apply a strategy for the two distortions of blurring with a Gaussian kernel and AWGN. The target QE is SSIM with a target QE value of 0.80±0.005; the proxy QE for finding PFOs is VIF with a tolerance of ±0.01. We also created a set of PFT test cases for VIF.
2. We target PSNR by applying the least-visible spatially-shaped VDG-noise as the distortion for image $x_1$, with AWGN as the distortion for image $x_2$. The target PSNR value is 27.5 dB, and the proxy QE is SSIM.
3. We repeat the attack described in (2) except this time we apply the most-visible spatially-shaped VDG-noise as the distortion for image $x_1$. In this case, the proxy QE for the PFO is VIF.
4. We target SSIM using a 3-step procedure as follows. First, we find an image $x_1$ by applying as the distortion the least-visible frequency-shaped VSNR-noise designed to have PSNR approximately 20 dB. Second, we find a second image $x_2$ using AWGN as the distortion to create a PFT for $(x_1, x_2)$ using SSIM as the target QE. Third, we use a VSNR proxy to obtain a PFO.
5. We repeat the attack described in (4) except using the most-visible frequency-shaped VSNR-noise designed to have PSNR approximately 25 dB. This technique can lead to a desired result of each PFT producing an FT and each PFO producing an FO in the target QE. However, even though the other attacks did not produce this desired result, they still provide valuable information about how the target and proxy QEs perform in a variety of situations.

Server 130, using the techniques described herein, can provide QE testing to supplement subjective testing for image and video quality estimators. Server 130 can perform targeted testing for a specific QE. Image pairs can be systematically generated with the specific intent of causing misclassification errors for a specific QE. These exemplary approaches can be applicable for any type of QE: full-reference, reduced-reference, or no-reference, including parametric bitstream QEs. In one embodiment, even after vulnerabilities in a QE have been identified, one may choose to deploy it anyway if it has also been shown to assist in other scenarios. For example, SSIM can be shown to be effective for comparing among images with contrast shifts, even though we show here that it is less effective comparing noisy images to blurry images. VSNR is effective at quantifying image quality, and was shown here to be useful as a proxy QE to target SSIM; however, we also showed it has systematic weaknesses for evaluating certain high-quality images.

Figure 7:
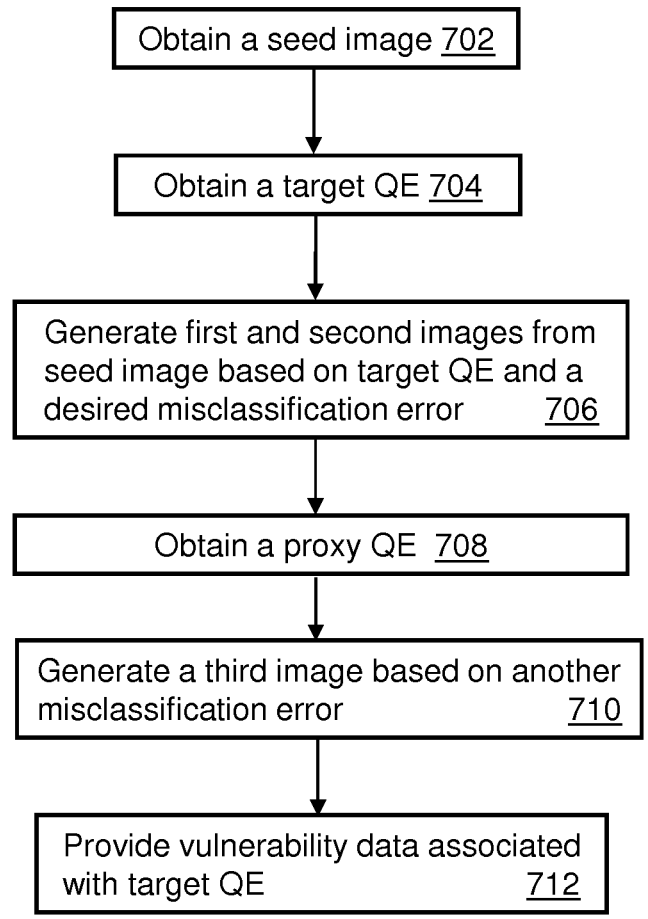
FIG. 7 depicts an illustrative embodiment of a method operating in portions of the system described in FIG. 1.

FIG. 7 depicts an illustrative method 700 that operates in portions of the devices and/or systems of FIG. 1. Method 700 can begin at 702 in which a seed image is obtained. At 704, one or more target QEs can be identified or obtained. First and second images can be generated or otherwise constructed from the seed image at 706. The pair of first and second images can be generated in a number of different ways and can be generated to obtain a particular misclassification error (e.g., a potential false tie) based on the targeted QE.

At 708, one or more proxy QEs can be identified or targeted from among a group of proxy QEs. In one embodiment, the selection of the proxy QE can be based on the process utilized to generate the first and second images, such as the particular distortion technique applied to the seed image. At 710, a third image can be generated that provides another misclassification error (e.g., a potential false ordering) with one or both of the first and second images. The third image can be generated or otherwise constructed in a number of different ways, such as through use of the proxy QE and/or a bisection search. At 712, vulnerability data can be generated or otherwise compiled which allows for adjustment or improvement of the target QE.

Upon reviewing the aforementioned embodiments, it would be evident to an artisan with ordinary skill in the art that said embodiments can be modified, reduced, or enhanced without departing from the scope and spirit of the claims described below. In one or more embodiments, the evaluation of the QEs can be performed by devices other than the server 130, including in a distributed environment and/or utilizing CPE.

One or more of the exemplary embodiments can generate vulnerability data from the various images, techniques and/or components described herein. The vulnerability data can be utilized for adjusting or improving one or more of the quality estimators that are being evaluated, including adjusting algorithms used by the quality estimators. The vulnerability data can include data or information that describes, or otherwise can be utilized for discerning, weaknesses in the quality estimators and/or for improving the function of the quality estimators.

Figure 8:
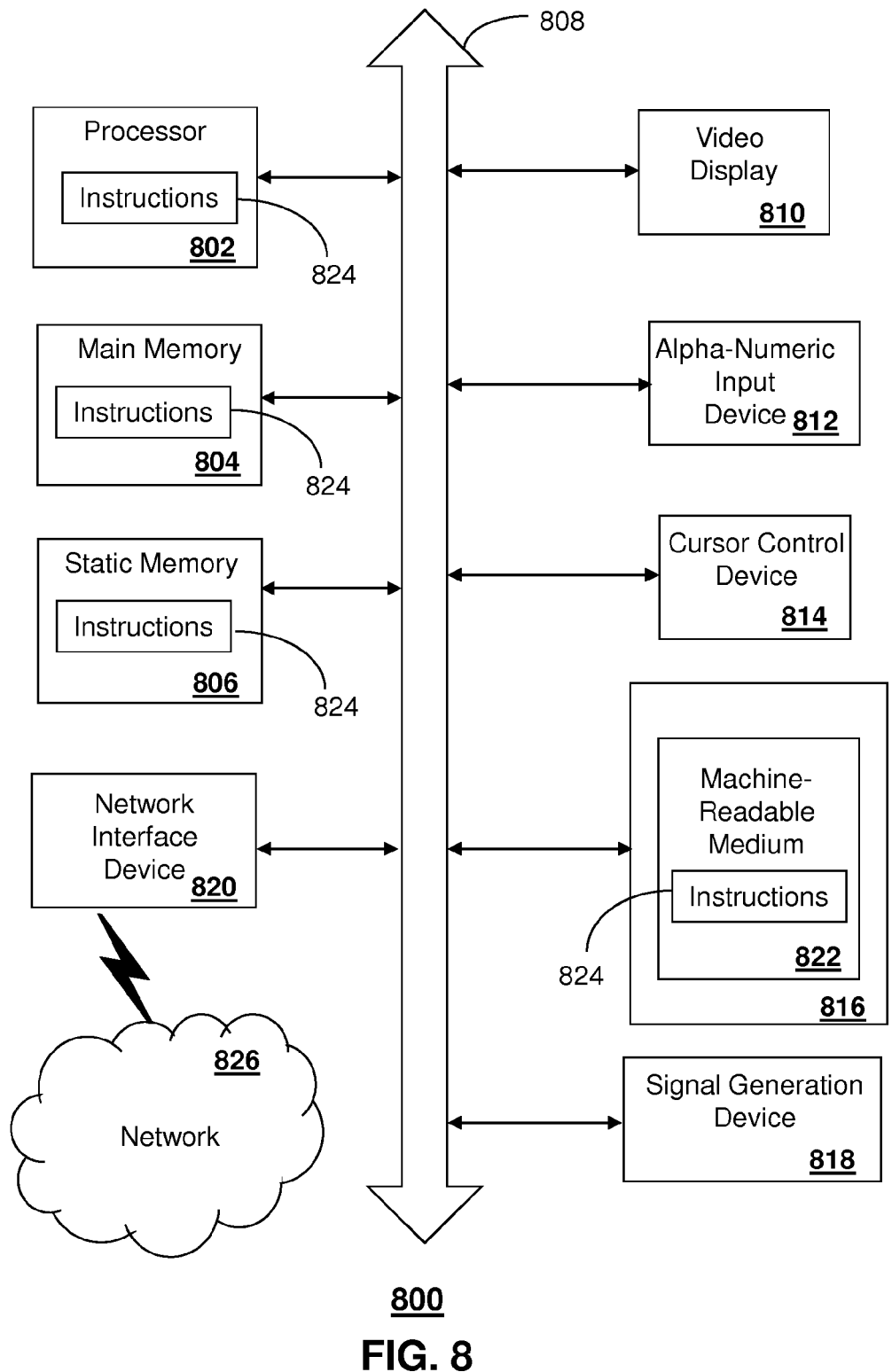
FIG. 8 is a diagrammatic representation of a machine in the form of a computer system within which a set of instructions, when executed, may cause the machine to perform any one or more of the methods discussed herein.

FIG. 8 depicts an exemplary diagrammatic representation of a machine or controller circuit in the form of a computer system 800 within which a set of instructions, when executed, may cause the machine to perform any one or more of the methods discussed above. One or more instances of the machine can operate, for example, as the server 130 as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

In another exemplary embodiment, a methodology is provided to systematically stress objective image quality estimators (QEs). Using computational results instead of expensive subjective tests, rigorous information can be obtained of a QE's performance on a constrained but comprehensive set of degraded images. The exemplary process can quantify many of a QE's potential vulnerabilities. Knowledge of these weaknesses can be used to improve a QE during its design process, to assist in selecting which QE to deploy in a real system, and/or to interpret the results of a chosen QE once deployed.

Large-scale subjective tests can be utilized to determine if a QE is accurate in a required situation. However, large-scale subjective tests are expensive and require careful construction to achieve an accurate answer to this question. Due to their high cost and high reward, the existence and increasing availability of subjective data for images leads some researchers to train their QE based on the subjective data. Even when cross-validation is used, the applicability of the resulting QE is limited by the peculiarities of the subjective test set. An unbiased process to evaluate the performance of a QE can be utilized. This independent validation process can use a test set of videos annotated with subjective ratings. QE designers can obtain the performance of their QE for a fee, so that the secrecy of the test set is maintained. Performance results can be reported using a common template, allowing easy comparison across multiple QEs. However, using constrained, expensive subjective tests to evaluate QE performance can still be limiting. A QE deployed to evaluate image quality in a real system is exposed to a greater variety of images or videos than those envisioned by the subjective test designers. For example, a QE for broadcast news should be able to handle composited images (with words and graphics added), images acquired from handheld devices, graphics images, to name a few examples. To be sufficiently robust across this wide variety of images, a QE should be thoroughly tested, not only using images that are expected, but also those from unexpected scenarios.

In one or more embodiments, a methodology is provided to find systematic weaknesses in the QE under test. For example, instead of answering the challenging question "Is this QE accurate?", the burden of proof can be lowered and the question "Is this QE inaccurate?" can be answered. Objective strategies can be considered to address this question. A complementary strategy can also be utilized to consider this question using targeted small-scale subjective tests. The current approach, relying solely on objective evaluation of a QE, can be based on a cost-benefit analysis. Low-cost but extensive computational search to find weaknesses without expensive subjective tests can be utilized. A QE can be evaluated using many reference images and many more impairment levels than can be evaluated in a subjective test. Typical subjective tests can consider no more than 30 images and no more than 7 levels for a given impairment (for example, JPEG compression).

In one or more exemplary embodiments, over 400 reference images and at least 24 impairment levels can be considered, a collection for which reliable subjective evaluation may be difficult or effectively impossible. The breadth of the analysis and the use of both expected and unexpected inputs allows an identification of a variety of potential weaknesses in many QEs. A QE that has a systematic weakness loses its interpretability, i.e., the QE scores cannot reliably distinguish high quality and low quality images. A system that relies upon such a QE can be vulnerable to a motivated attacker who can obtain unfair advantage.

The exemplary embodiment(s) provide a number of advantages. First, during the design process of a QE, it can identify potential systematic weaknesses that can then be eliminated. Second, when evaluating which QE to use for a specific application, an understanding of how each QE performs in a variety of situations allows selection of the most appropriate QE. Finally, once a QE has been selected for deployment, its limitations can be quantified using this methodology. Even if a QE has known vulnerabilities, it may be the best choice due to cost or system constraints.

Example 2

A large image collection can be used that is comprised of part of one family's digital photo album. All reference images are recorded directly from a digital camera using "High Quality" JPEG, with no subsequent processing. Four different cameras are used, each with a different pixel resolution as shown in FIG. 9.

In addition, we include in this collection the reference images of three subjective test sets, LIVE (as described by H. R. Sheikh, Z. Wang, L. Cormack, and A. C. Bovik, "LIVE image quality assessment database release 2," 2005, http://live.ece.utexas.edu/research/quality/subjective.htm.); TID-2008 (as described by N. Ponomarenko, V. Lukin, A. Zelensky, K. Egiazarian, M. Carli, and F. Battisti, "TID2008—a database for evaluation of full reference visual quality assessment metrics," *Advances of Modern Radioelectronics*, vol. 10, pp. 30-45, 2009); and CSIQ (as described by E. C. Larson and D. M. Chandler, "Most apparent distortion: Full-reference image quality assessment and the role of strategy," *Journal of Electronic Imaging*, vol. 19, no. 1, March 2010, http://vision.okstate.edu/index.php?loc=csig. The disclosure of each of these references is incorporated herein by reference.

We systematically degrade more than 450 images with a variety of degradations (including Gaussian blur, AWGN, JPEG and JPEG-2000 compression) using over 20 discrete severities of degradation. For example, for AWGN, we use 30 logarithmically spaced values of $\sigma^2 \in [0, 1000]$. Additionally, for JPEG and JPEG-2000 compression, we apply two quality-invariant image transformations: cropping and rotation.

This large collection of reference and degraded images provides a test set from which one can extract valuable information regarding the performance of any QE, without the need for subjective testing. For this work, we select both full-reference (FR) and no-reference (NR) QEs, which quantify image quality with and without using a reference image, respectively. Among the many QEs available, in this example, we choose BIQI, CPBD, JP2k-NR, JNBM, JQS, SSIM, VIF, for which implementations are available from their authors, in addition to GBIM, and PSBIM. There is no uniformity among these QEs regarding their designed maximum and minimum values, nor regarding whether visual quality improves as QE scores increase or decrease. In this example, we choose to report the raw scores of each QE; therefore FIG. 10 indicates QE type and includes the QE score expected for a "best quality" image. NR-blur QEs are designed to measure only the impact of blur on image quality; NR-block QEs are designed to measure only the impact of blockiness. JP2k-NR is designed to measure the impact of JPEG-2000 compression, and BIQI is designed to measure a variety of impairments. The methodology of this example, evaluates the tremendous amount of data generated by applying each QE to the large collection of degraded and nearly undegraded images.

An ideal QE will produce values that are in perfect agreement with subjective test scores. To characterize the deviations of the actual QE scores from this ideal, the following performance measures of QEs are commonly used: the root mean-squared error (RMSE), Pearson linear and Spearman rank-order correlation coefficients between the objective and subjective ratings, and the outlier ratio. Two additional measures that assess the ability of a QE to specify relative quality among pairs of images are the resolving power and the misclassification error, defined by Brill et al. in "Accuracy and cross-calibration of video-quality metrics: new methods from ATIS/T1A1," *Signal Processing: Image Communication*, vol. 19, pp. 101-107, February 2004, the disclosure of which is hereby incorporated by reference.

These performance measures rely on subjective data, which is sparse and difficult to obtain accurately. Therefore, in this example, we describe five distinct scenarios in which objective testing can give us valuable information, both about how effectively a QE performs and how to interpret the resulting QE scores: 1) According to the QE under test, undegraded images should all have high quality; 2) According to the QE under test, heavily degraded images should all have poor quality; 3) Identical quality scores should be produced despite a simple transformation of a degraded image, like cropping by a few pixels or rotation by ninety degrees; 4) Monotonically increasing severity of a single degradation on a single reference image should, depending on the degradation and the type of QE, produce either a monotonic or an invariant response in the QE scores; 5) If two QEs disagree about the relative quality of two images, then one of the QEs is incorrect. The first two correspond to absolute QE scores of a single image, while the remaining three correspond to relative QE scores between one or more pairs of images. The last case is particularly useful across multiple degradation types.

Absolute QE scores are useful for product benchmarking, content acquisition; and system provisioning. In these applications, the absolute QE score of a single image is typically compared to a fixed threshold to determine if the image has sufficient quality or not. While NR QEs must quantify how much a degradation affects image quality, one of their most challenging tasks is to recognize when an image is undegraded. The QE score for any undegraded image should indicate high quality. Conversely, if an image is heavily blurred or has strong additive noise, the subjective quality is certain to be low. For these images, a QE should produce a score that indicates poor quality. To evaluate whether there is a reliable threshold that allows the tested NR QE to distinguish among low and high quality images, we apply the NR QEs to two subsets of the image collection: undegraded images and their corresponding heavily degraded images.

For each image subset, we compute the distribution of the QE scores across the set of images and report the 5-th, 25-th, 75-th and 95-th percentile of this distribution. FIG. 11 shows the results for the undegraded images, while FIGS. 12-14 show results for heavily degraded JPEG, Gaussian blur, and JPEG-2000, respectively. As can be seen from FIG. 11, scores for BIQI and CPBD on undegraded images span nearly the entire range of values for these QEs. Further, while JQS typically reports scores near the desired value of 10, close to 30% of its scores exceed its reported maximum.

The ranges of BIQI, CPBD, JNBM, and PSBIM in FIGS. 11 and 12 show significant overlap; no one threshold can correctly partition the undegraded and badly degraded JPEG images. Of interest are the negative scores for JQS and the BIQI scores above 100 in FIG. 12. Scores for JNBM are actually lower for heavily blurred images than for the undegraded images. PSBIM, a blocking QE, responds nearly as strongly to blur as to JPEG. While it is not apparent from these tables, BIQI, JP2k-NR, JNBM, and JQS all behave quite differently for the larger images than for the small images typically used in subjective test data. The broader set of undegraded images may not share the specific statistical characteristics of the images in these QEs' training set.

Relative QE scores are useful for algorithm optimization and product benchmarking. There are three cases where exploring relative QE scores for a pair of images can provide useful information about the accuracy of a QE: when a QE should give nearly similar scores; when a QE should respond monotonically as a degradation increases in severity for the same reference image; and when two (or more) QEs disagree about which image of a pair of images is better. To describe performance across pairs of images, we adapt the misclassification errors defined by Brill et al. "Accuracy and cross-calibration of video-quality metrics: new methods from ATIS/T1A1" between a given QE and subjective data. Their misclassification errors include false rank or false ordering (FO) (the objective QE rates an image pair opposite to the humans), false differentiation (FD) (the objective QE rates an image pair as different but the humans do not), and false tie (FT) (the humans rate an image pair as having different quality but the objective QE does not). In our case subjective data does not exist; therefore, we adapt these by replacing the human ratings with information that serves as a proxy. One useful proxy is the knowledge that a QE should create equal scores for an image pair that has undergone a quality-invariant transform (such as cropping). Another is that as a single degradation (i.e., JPEG) increases in severity, the QE should respond monotonically. First, we explore whether a QE produces similar scores when an image is cropped by a few pixels. To evaluate this property, for each reference image we choose a mid-level degradation and compute the maximum variation in QE scores when this degraded image is cropped by between 0-9 pixels. The distribution of this variation, across each reference image, is reported in FIG. 17.

We see that significant FDs occurs for many QEs. JP2k-NR, BIQI, JQS, GBIM, and PSBIM all perform poorly on cropped images. The first two QEs rely on maximally decimated wavelets while the latter four assume known locations for block boundaries. CPBD is quite robust to cropping and rotation (not shown). The vulnerabilities identified in FIG. 15 can be important given the threat models described by Cheswick et al in "Vulnerability assessment of image and video quality estimators," in *Wkshp. On Video Proc. and Quality Metrics*, January 2010, the disclosure of which is hereby incorporated by reference. If a system uses one of the QEs with substantial fluctuation given crop, an attacker needs only choose the cropped image with the best (or worst) score; this will trick the system into behaving as though the image has better (or worse) quality than it actually has. Second, we explore the requirement of monotonicity. Within a single degradation, FR QEs should respond monotonically as the severity of the degradation increases. NR-blocking QE should respond monotonically to JPEG; NR-blurring QE should respond monotonically to increasing blur and JPEG-2000 compression. The JP2k-NR QE should respond monotonically to JPEG-2000. FIG. 16 illustrates the performance measures we propose to evaluate non-monotonicities. It shows an example where a QE does not behave monotonically as one reference image is degraded with increasing severity. In general, any non-monotonicity will result in at least one pair of images that has a misclassification error. The type of misclassification depends on the relative position of the local minima and maxima in the non-monotonicity.

In this example, the sharp decrease in the QE score on the right is likely to cause a FD, due to the small change in distortion level between the local minimum and maximum QE scores. The more gradual variation on the left is likely to lead to a pair with visually different quality and therefore a FO, due to the higher QE score associated with a much smaller distortion level. Without subjective testing, it is impossible to know which situations exists. Therefore, we denote these as potential misclassifications. ΔQEmax quantifies the severity of the potential false ordering (PFO) or potential false difference (PFD), while Δlevelmax quantifies the severity of a Potential False Tie (PFT). For each reference image, if there is a non-monotonicity for a given degradation, we search for potential misclassifications. FIG. 17 shows the 80% percentile of the distribution of ΔQEmax and Δlevelmax across reference images.

This table of FIG. 17 shows that many QEs exhibit some non-monotonicities. However, with the exception of BIQI, which has the hardest task since it is designed for multiple individual degradations, most of the PFOs are limited in either ΔQEmax or Δlevelmax. Third, when comparing across multiple distortion types without subjective data, it is difficult to quantify correct QE performance. For a given reference image, what level of blur produces equivalent quality to a given level of JPEG? However, by examining the relationship between the scores of two QEs on such a pair of images, we are able to discover useful information about how the two QEs perform. In particular, we search across multiple QEs to identify cases of conflicting orderings (CO), in which two QEs disagree about how to rate an image pair. In the event of such a disagreement, one of the two QEs is necessarily inconsistent with human ratings. As was discussed above for FIG. 16, one systematic weakness can result in a variety of misclassification errors. Therefore, we describe the severity of the weakness using the maximum PFD for each QE. For each reference image, given two degradation types, we search for all possible conflicting orderings. Next, we search for the image pair that one QE rates as having "equal quality" and the other QE rates as having maximally different quality. This pair has the maximum possible PFD for that QE. SSIM can have a systematic weakness when comparing noisy and blurry images. Using the same 10 reference images as described above with respect to the Example 1, our systematic strategy indicates the 75th percentile of PFD for SSIM is 0.29; for VIF it is 0.30. Both are dramatically higher than the FD previously identified. Using 146 images, the severity of the PFD increases, with the 75%-tiles of 0.60 for SSIM and 0.53 for VIF. Subjective tests are necessary to determine if the PFD are actual FD; based on the above-results, it is likely that VIF correctly orders these images and SSIM does not. Comparing degradations of AWGN and JPEG, the corresponding numbers are 0.58 and 0.53 for SSIM and VIF across 146 images, while for degradations of blur and JPEG, they are 0.04 and 0.19 across 440 images. Thus, SSIM and VIF have much greater agreement between degradations of blur and JPEG than among the other pairs of degradations.

In this example, we rely on extensive computational resources to identify inconsistencies and to search for potential vulnerabilities in existing QEs, without requiring any subjective experiments. We demonstrated a set of systematic stress tests using a large collection of undegraded images, composed of a family's digital photo album and commonly used, publicly available test images. We systematically applied a variety of degradations to the image collection using over 20 levels of severity per degradation. Inconsistencies in the performance of individual QEs, including BIQI and CPBD, were identified due to an overlap in the range of QE scores associated with collections undegraded and badly degraded images. Evidence for a vulnerability in a QE was provided when a quality-invariant transform produced images with disparate QE scores. Furthermore, applying multiple QEs to the image collection affords comparisons between QEs, leveraging more accurate QEs to identify weaknesses in less accurate QEs. We suspect that the QEs examined in this example are not alone in exhibiting such systematic weaknesses. This work is just one part of a framework for more rigorous testing of QEs and these tests can become part of the core analysis presented for every image QE. The proposed computational tests can be complementary to the typical subjective tests; they do not need to replace the need for testing according to specifications. Furthermore, the tests discussed in this example explored only some approaches to systematic stress testing and other approaches may be applied. For example, this example considered images with only a single degradation type. In one or more embodiments, this large-scale computational testing can be leveraged to facilitate targeted, small-scale subjective tests. The collection of applicable tests can be extended within the proposed framework of systematic stress testing.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

What is claimed is:

1. A method comprising:
obtaining a seed image;
obtaining a target quality estimator;
generating first and second images from the seed image utilizing an image processor, wherein the first and second images are generated by adjusting the seed image so that the first and second images have a potential false tie according to the target quality estimator;
obtaining a proxy quality estimator; and
generating a third image from the first and second images utilizing the image processor, wherein the third image is generated based on the proxy quality estimator so that the third image has a potential false ordering according to the target quality estimator.

2. The method of claim 1, wherein the generating of the third image comprises utilizing a bisection search over a single variable of a distortion function of the target quality estimator to obtain the third image, wherein the target quality estimator has a monotonic response to parameter variation.

3. The method of claim 1, wherein the proxy quality estimator comprises a visual signal-to-noise ratio quality estimator.

4. The method of claim 1, wherein the proxy quality estimator comprises a visual information fidelity quality estimator.

5. The method of claim 1, wherein the proxy quality estimator comprises a structural similarity quality estimator.

6. The method of claim 1, wherein the generating of the first and second images comprises utilizing a Gaussian kernel and additive white Gaussian noise.

7. The method of claim 1, wherein the generating of the first and second images comprises utilizing a visual distortion gauge noise.

8. The method of claim 1, wherein the generating of the first and second images comprises utilizing a least-visible spatially-shaped visual distortion gauge noise to distort the first image and an additive white Gaussian noise to distort the second image.

9. The method of claim 1, wherein the generating of the first and second images comprises utilizing a least-visible frequency-shaped visual signal-to-noise ratio noise to distort the first image and an additive white Gaussian noise to distort the second image.

10. The method of claim 1, wherein the generating of the first and second images comprises utilizing a most-visible frequency-shaped visual signal-to-noise ratio noise to distort the first image and an additive white Gaussian noise to distort the second image.

11. The method of claim 1, comprising:
generating vulnerability data from the first, second and third images; and
adjusting the target quality estimator based on the vulnerability data.

12. The method of claim 1, comprising performing subjective testing on the first, second and third images to confirm the potential false tie and the potential false ordering.

13. The method of claim 1, wherein the obtaining of the proxy quality estimator comprises selecting the proxy quality estimator from a group of proxy quality estimators based on a distortion process utilized for the generation of the first and second images from the seed image.

14. A non-transitory computer-readable storage medium comprising computer instructions, which responsive to being executed by a processor cause the processor to perform operations comprising:

applying a quality estimator algorithm to a first image to determine a first quality rating for the first image, wherein the first image is undegraded;
obtaining first evaluation criteria by determining whether the first quality rating satisfies a high quality scoring threshold;
applying the quality estimator algorithm to a second image to determine a second quality rating for the second image, wherein the second image is degraded;
obtaining second evaluation criteria by determining whether the second quality rating satisfies a low quality scoring threshold;
monotonically increasing an image degradation to generate third images, wherein the third images are degraded images;
applying the quality estimator algorithm to the third images to determine third quality ratings for the third images;
obtaining third evaluation criteria by determining whether the third quality ratings produce one of a monotonic or invariant response for the third images; and
evaluating the quality estimator algorithm based on the first, second and third evaluation criteria.

15. The non-transitory computer-readable storage medium of claim 14, wherein the operations further comprise:
applying a transformation to a fourth image to generate a transformed fourth image, wherein the transformation comprises cropping, rotation or a combination thereof;
applying the quality estimator algorithm to the fourth image and the transformed fourth image to determine fourth quality ratings; and
obtaining fourth evaluation criteria by determining whether the fourth quality ratings differ from each other by a differential threshold,
wherein the evaluation of the quality estimator algorithm is based in part on the fourth evaluation criteria.

16. The non-transitory computer-readable storage medium of claim 15, wherein the operations further comprise:
applying the quality estimator algorithm and another quality estimator algorithm to at least a pair of fifth images to determine relative quality ratings; and
obtaining fifth evaluation criteria by determining whether the relative quality ratings for the quality estimator algorithm and the other quality estimator algorithm differ from each other,
wherein the evaluation of the quality estimator algorithm is based in part on the fifth evaluation criteria.

17. The non-transitory computer-readable storage medium of claim 14, wherein the operations further comprise:
determining an overlap of quality ratings produced by application of a group of quality estimator algorithms to undegraded images and highly degraded images, wherein the group of quality estimator algorithms includes the quality estimator algorithm; and
identifying inconsistencies in performance of some of the group of quality estimator algorithms based on the overlap.

18. A server comprising:
a memory having computer instructions; and
a controller circuit coupled with the memory, wherein the controller circuit when executing the computer instructions performs operations comprising:
distorting a seed image to generate first and second images, wherein the distortions cause the first and second images to have a potential false tie according to a target quality estimator; and generating a third image from the first and second images, wherein the third image is generated based on a proxy quality estimator so that the third image has a potential false ordering according to the target quality estimator.

19. The server of claim 18, wherein the controller circuit when executing the computer instructions performs the operations comprising generating vulnerability data from the first, second and third images for adjusting the target quality estimator.

20. The server of claim 18, wherein the distortions of the seed image utilize visual signal-to-noise ratio noise, additive white Gaussian noise, visual distortion gauge noise or a combination thereof, wherein the generation of the third image comprises utilizing a bisection search over a single variable of a distortion function of the target quality estimator to obtain the third image, and wherein the target quality estimator has a monotonic response to parameter variation.

* * * * *